United States Patent [19]

Schenk

[11] Patent Number: 4,673,176
[45] Date of Patent: Jun. 16, 1987

[54] SOFT NIP DAMPING INVERTER

[75] Inventor: Richard C. Schenk, Webster, N.Y.

[73] Assignee: Xerox Corporation, Stamford, Conn.

[21] Appl. No.: 193,228

[22] Filed: Oct. 2, 1980

[51] Int. Cl.⁴ .......................................... B65H 29/20
[52] U.S. Cl. ................................... 271/186; 271/274; 271/3
[58] Field of Search ................... 271/DIG. 9, 65, 184, 271/185, 186, 188, 3, 314, 291, 225, 272, 273, 274; 493/420, 421; 355/3 SH, 23, 24

[56] References Cited

U.S. PATENT DOCUMENTS

| 3,224,558 | 12/1965 | Carlen | 271/DIG. 9 X |
| 3,273,886 | 9/1966 | Taylor | 271/225 |
| 3,523,687 | 8/1970 | Petersen et al. | 271/186 |
| 3,856,295 | 12/1974 | Looney | 271/DIG. 9 X |
| 3,942,785 | 3/1976 | Stange | 271/DIG. 9 X |
| 4,214,740 | 7/1980 | Acquaviva | 271/3 |
| 4,285,508 | 8/1981 | Kaneko | 271/65 X |
| 4,359,217 | 11/1982 | Roller et al. | 271/DIG. 9 X |

OTHER PUBLICATIONS

Bullock, M. K., "Sheet Reverser", IBM Tech. Disc. Bull., vol. 20, No. 1, Jun. 1977, p. 22.
Xerox Disclosure Journal, vol. 4, No. 2, Mar./Apr. 1979, p. 133, George J. Roller.

Primary Examiner—Joseph J. Rolla
Attorney, Agent, or Firm—William A. Henry, II

[57] ABSTRACT

A copier capable of producing simplex and duplex copies includes a tri-roll inverter that employs a corrugation roll on roll return force applicator located downstream of and off line from the input nip of the tri-roll input/output members. A sheet driven by the input nip into the inverter is corrugated as it penetrates the roll on roll return force applicator nip. When the last portion of the sheet is driven into the return force applicator nip, the friction return force of the nip will cause the sheet to drive into a foam roll which delivers the sheet to the output nip.

7 Claims, 3 Drawing Figures

SOFT NIP DAMPING INVERTER

The present invention relates to an improved sheet inverting system, and more particularly to an inverter providing improved handling of variable sized sheets within the inverter which employs a return force applicator.

As xerographic and other copiers increase in speed, and become more automatic, it is increasingly important to provide higher speed yet more reliable and more automatic handling of both the copy sheets being made by the copier and the original document sheets being copied. It is desired to accommodate sheets which may vary widely in size, weight, thickness, material, condition, humidity, age, etc. These variations change the beam strength or flexural resistance and other characteristics of the sheets. Yet the desire for automatic and high speed handling of such sheets without jams, misfeeds, uneven feeding times, or other interruptions increases the need for reliability of all sheet handling components. A sheet inverter is one such sheet handling component with particular reliability problems.

Although a sheet inverter is referred to in the copier art as an "inverter", its function is not necessary to immediately turn the sheet over (i.e. exchange one face for the other). Its function is to effectively reverse the sheet orientation in its direction of motion. That is, to reverse the lead edge and trail edge orientation of the sheet. Typically in inverter devices, as disclosed here, the sheet is driven or fed by feed rollers or other suitable sheet driving mechanisms into a sheet reversing chute. By then reversing the motion of the sheet within the chute and feeding it back out from the chute, the desired reversal of the leading and trailing edges of the sheet in the sheet path is accomplished. Depending on the location and orientation of the inverter in a particular sheet path, this may, or may not, also accomplish the inversion (turning over) of the sheet. In some applications, for example, where the "inverter" is located at the corner of a 90° to 180° inherent bend in the copy sheet path, the inverter may be used to actually prevent inverting of a sheet at that point, i.e., to maintain the same side of the sheet face-up before and after this bend in the sheet path. On the other hand, if the entering and departing path of the sheet, to and from the inverter, is in substantially the same plane, the sheet will be inverted by the inverter. Thus, inverters have numerous applications in the handling of either original documents or copy sheets to either maintain, or change, the sheet orientation.

Inverters are particularly useful in various systems of pre or post collation copying, for inverting the original documents, or for maintaining proper collation of the sheets. The facial orientation of the copy sheet determines whether it may be stacked in forward or reversed serial order to maintain collation. Generally, the inverter is associated with a by-pass sheet path and gate so that a sheet may selectively by-pass the inverter, to provide a choice of inversion or non-inversion. The present invention may be utilized, for example, in the chute inverter of a simplex/duplex copying system of the type disclosed in U.S. patent application Ser. No. 071,613, filed Aug. 31, 1979, by the same Assignee, in the name of Ravi B. Sahay, now U.S. Pat. No. 4,278,344.

Typically in a reversing chute type inverter, the sheet is fed in by a positive feeding grip or nip into the inverter chute, and then reacquired by a different feeding nip to exit the inverter chute. Such a temporary loss of positive gripping of the sheet by any feed mechanism during the inversion increases the reliability problems of such inverters.

The present invention is directed to improving the reliability of the inverter in this and other critical aspects of this operation, yet to also accommodate a range of differnt sheet sizes within the same size inverter and the same mechanism. The present invention provides these improvements with an extremely low cost and simple inverter apparatus having a uniquely constructed and positioned constantly rotating roll on roll retard drive mechanism located downstream of and slightly either side of the sheet input nip.

As noted above, many inverters, particularly those utilizing only gravity, have reliability problems in the positive output or return of the sheet of a consistent time after the sheet is released in the inverter chute. Those inverters which use chute drive rollers or other drive mechanisms have a more positive return movement of the sheet, but this normally requires a movement actuator (clutch or solenoid) for the drive and either a sensor or a timing mechanism to determine the proper time to initiate the actuation of this drive mechanism so that is does not interfere with the input movement of the sheet, and only thereafter acts on the sheet to return it to the exit nip or other feed-out means. Furthermore, inverter reliability problems are aggravated by variations in the condition or size of the sheet. For example, a pre-set curl in the sheet can cause the sheet to assume an undesirable configuration within the chute when it is released therein, and interfere with feed-out.

In contrast, the inverter disclosed herein can provide positive buckling of the sheet between drive rollers located within a chute engaging the lead edge of the sheet and an input feeder which is pushing the trail edge of the sheet into the chute, for a positive sheet ejection force. Yet a conventional range of sheet dimensions, and a wide range of sheet thicknesses and weights, may be accommodated within this inverter chute, without sacrificing reliability of output feeding from the inverter chute. The inverter disclosed herein allows a highly accurate and compact inverter configuration.

A preferred feature of the present invention is to provide in a sheet inverter mechanism having tri-rolls that feed sheets into and out of a first end of a sheet reversing chute, to reverse the lead and trail edge orientation of the sheets, the improvement comprising soft drive scuffer means adapted to receive the leading edges of the sheets forwarded by an input nip of said tri-rolls, said scuffer means serving to dampen the kinetic energy of the incoming sheets while simultaneously driving sheets out of said reversing chute, said scuffer means being located either above or below said input nip.

A further preferred feature is to provide, in a method of reversing the direction of sheets of variable dimensions by feeding them into one end of a sheet reversing chute and feeding them out of the same end of said chute so that the lead edge and trail edge orientation of the sheets is reversed, the improvement comprising driving the lead edge of the sheets into said chute by contact with a first urethane roll and a rubber roll that forms an input nip, providing a foam roll, applying a return force against the sheets as they are driven into said chute, said return force being applied by a corrugating upper roll and lower roll nip with said upper roll constantly rotating in a direction opposite to the incoming direction of the sheets in order to buckle and thereby positively urge the trail edge of the sheets against said foam roll and back out from the chute with the assistance of an output driving nip formed by said rubber roll and a second urethane roll, and locating said return force nip off center with respect to said input nip.

Further features and advantages of the invention pertain to the particular apparatus and steps whereby the above noted aspects of the invention are attained. Accordingly, the invention will be better understood by reference to the following description, and to the drawings forming a part thereof, which are approximately to scale, wherein.

Figure 1:
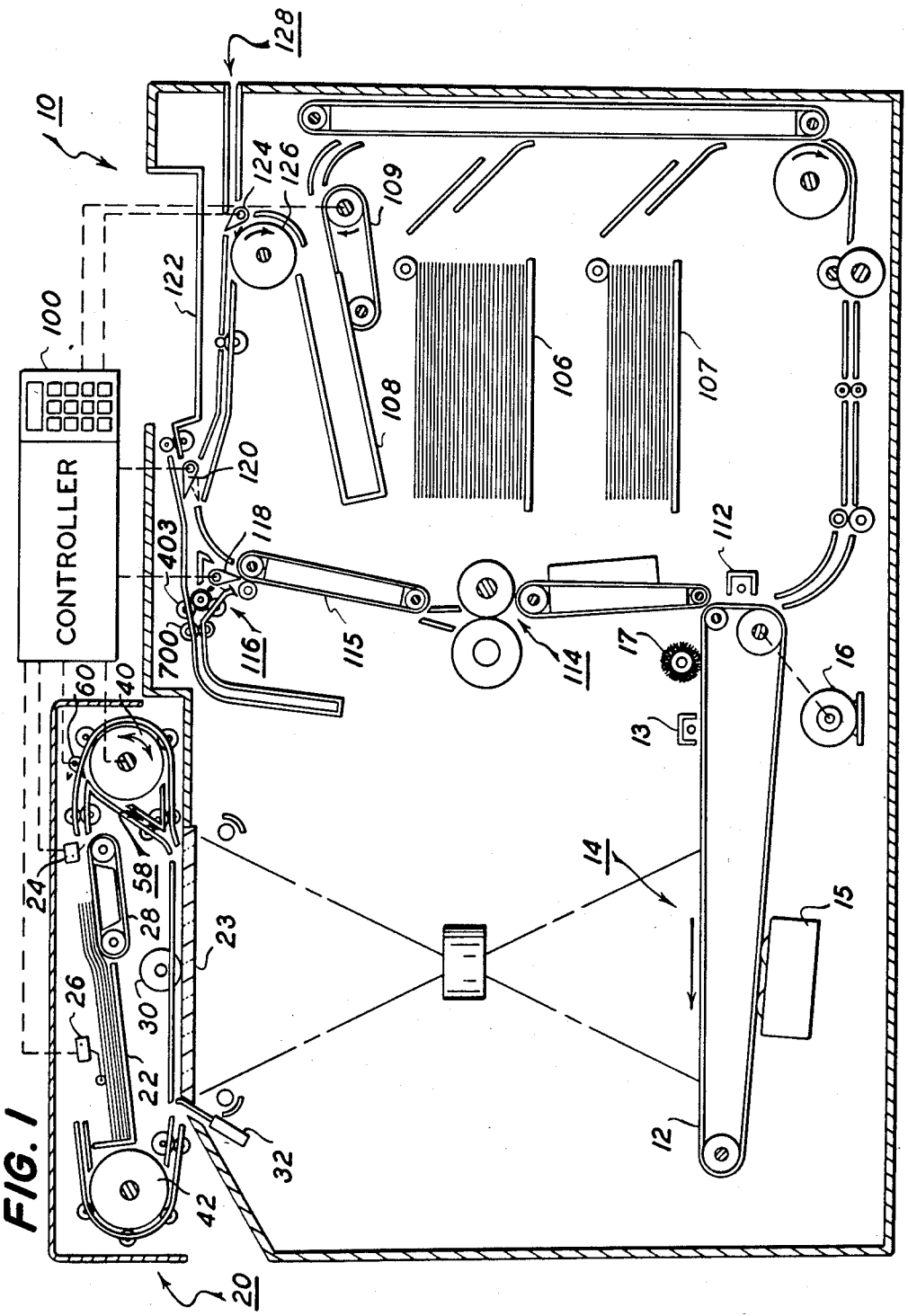
FIG. 1 is a schematic side view of an exemplary copier incorporating an aspect of the present invention.

Referring to the exemplary xerographic copier 10 shown in FIG. 1, and its exemplary automatic document feeding unit 20, it will be appreciated that various other recirculating document feeding units and copiers may be utilized with the present invention. This copier is described in detail in U.S. application Ser. No. 071,613, filed Aug. 31, 1979, and is incorporated herein by refernce to the extent necessary for the practice of the present invention.

The exemplary copier 10 conventionally includes a xerographic photoreceptor belt 12 and the xerographic stations acting thereon for respectively charging 13, exposing 14, developing 15, driving 16 and cleaning 17. The copier 10 is adapted to provide duplex or simplex pre-collated copy sets from either duplex or simplex original documents copied from the recirculating document handler 20. Two separate copy sheet trays 106 and 107 are provided to feed clean copy sheets from either one. The control of the sheet feeding is, conventionally, by the machine controller 100. The controller 100 is preferably a known programmable microprocessor as exemplified by U.S. Pat. No. 4,144,450, issued to J. Donahue et al. on Mar. 13, 1979, which conventionally also controls all of the other machine functions described herein including the operation of the document feeder, the document and copy sheet gates, the feeder drives, etc., and is incorporated herein by reference. As further disclosed, it also conventionally provides for storage and comparison of the counts of the copy sheets, the number of documents recirculated in a document set, the number of copy sets selected by the operator through the switches thereon, etc.

The copy sheets are fed from a selected one of the trays 106 or 107 to the xerographc transfer station 112 for the transfer of the xerographic image of a document page to one side thereof. The copy sheets here are then fed through vacuum transports vertically up through a conventional roll fuser 114 for the fusing of the toner image thereon. From the fuser, the copy sheets are fed to a gate 118 which functions as an inverter selector finger. Depending on the position of the gate 118, the copy sheets will either be deflected into a sheet inverter 116 or bypass the inverter and be fed directly onto a second decision gate 120. Those copy sheets which bypass the inverter 116 (the normal path here) have a 90° path deflection before reaching the gate 120 which inverts the copy sheets into a face-up orientation, i.e., the image side which has just been transferred and fused is face-up at this point. The second decision gate 120 then either deflects the sheets without inversion directly into an output tray 122 or deflects the sheets into a transport path which carries them on without inversion to a third decision gate 124. This third gate 124 either passes the sheets directly on without inversion into the output path 128 of the copier, or deflects the sheets into a duplex inverting roller transport 126. The inverting transport 126 feeds the copy sheets into a duplex tray 108. The duplex tray 108 provides intermediate or buffer storage for those copy sheets which have been printed on one side and on which it is desired to subsequently print an image on the opposite side thereof, i.e. the sheets being duplexed. Due to the sheet inverting by the roller 126, these buffer set copy sheets are stacked into the duplex tray face-down. They are stacked in the duplex tray 108 on top of one another in the order in which they were copied.

For the completion of duplex copying, the previously simplexed copy sheets in the tray 108 are fed seriatim by the bottom feeder 109 from the duplex tray back to the transfer station for the imaging of their second or opposite side page image. This duplex copy sheet path is basically the same copy sheet path provided for the clean sheets from the trays 106 or 107, illustrated at the right hand and bottom of FIG. 1. It may be seen that this sheet feed path between the duplex feeder 109 and the transfer station 112 inverts the copy sheets once. However, due to the inverting roller 126 having previously stacked these sheets face-down in the tray 108, they are presented to the transfer station 112 in the proper orientation, i.e., with their blank or opposite sides facing the photoreceptor 12 to receive the second side image. The now duplexed copy sheets are then fed out through the same output path through the fuser 114 past the inverter 116 to be stacked with the second printed side faceup. These completed duplex copy sheets may then be stacked in the output tray 122 or fed out past the gate 124 into the output path 128.

The output path 128 transports the finished copy sheets (simplex or duplex) either to another output tray, or, preferably, to a finishing station where the completed pre-collated copy sheets may be separated and finished by on-like stapling, stitching, glueing, binding, and/or off-set stacking.

Figure 2:
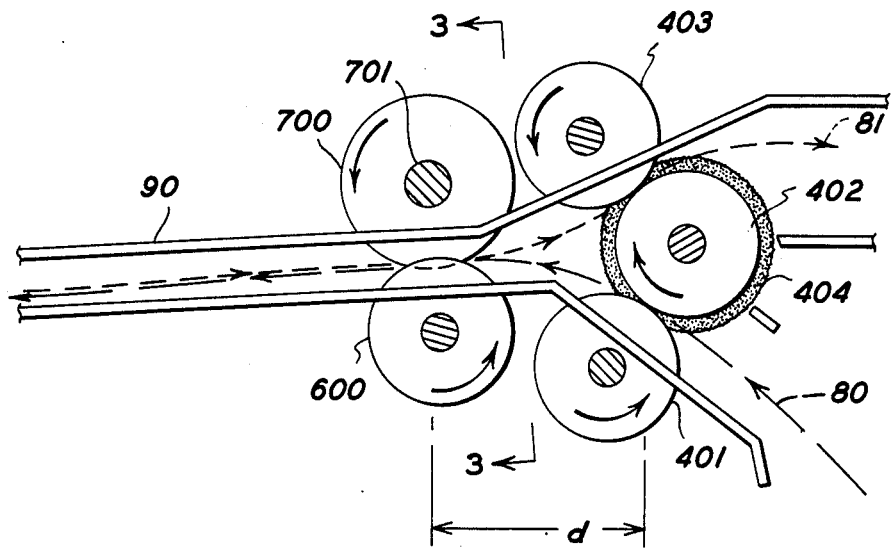
FIG. 2 is an exploded side view of the inverter shown in FIG. 1.

In reference to an aspect of the present invention and FIG. 2, when inversion of copy sheets is required, for example, job recovery, maintaining face-up or face-down output collation, simplex/duplex copying with an odd number of simplex copies, etc., tri-roll inverter 116 is used. Generally, sheet inversion is accomplished by a twin nip tri-roller system with the center roll assembly being the primary drive roll. This configuration forms the input and output nips with an inversion zone located between the nips.

The incoming sheet passes through the input nip, and as the trail edge exits the input nip, an opposing force on the sheet maintains this edge in contact with the center roll assembly. This roll assembly has a series of foam roll segments affixed outboard of the central main drive roll. These foam segments are larger in diameter than center drive roll to insure that the edge of the sheet will penetrate the surface of the foam roll. The action of maintaining the sheet against the center roll assembly and the rotational direction of this assembly will result in the edge of the sheet to be lifted and guided by the foam roll segments into the output nip. Once in the output nip, the sheet will be transported out of the inverter and reinserted into the main paper path.

A corrugation nip is located at a critical distance "d" of about 31 mm from the input nip and allows the sheet to enter the corrugation roll set without buckling. The section modulus of the sheet increases as the sheet is corrugated by the rolls. This additional stiffness affords a greater opertional latitude in overdriving the corrugation nip.

The location of the corrugation nip above the input nip coupled with the increased stiffness imparted by the corrugation rolls, results in a natural line of action toward the output roll nip assisting in sheet transfer between nips. It should be understood that the corrugation nip would be below the input nip if the location of the input and output nip were reversed from what is shown in FIG. 2, i.e., the input nip was on top and the output nip was on the bottom of the tri-roll combination. The deflection of the sheet by the corrugation rolls develops a normal force against the drive roll. This normal force and the dynamic coefficient of friction between the corrugation drive roller and sheet creates the force required for the sheet to be maintained in contact with the foam roll segments. A key functional parameter of this inversion system is the control of the roll penetration and coefficient of drive to develop an adequate drive back force for all paper weights and not exceed yield stress of heavy weight sheets, which would result in sheet marking and/or damage. More specifically, copy sheets are fed from either tray 106 or 107 past transfer means 112 and onto conveyor 115. As a sheet leaves conveyor 115, it approaches decision gate 118 which is controlled by controller 100. Gate 118 is actuated to the right as viewed in FIG. 1 which causes the sheet to travel in the direction of arrow 80 (which represents an incoming sheet) to be deflected into an input nip formed between rollers 401 and 402. These rollers drive the sheet into chute 90 and subsequently into a roll on roll nip formed between idler spool 600 and drive roller 700 which is driven by conventional means (not shown). Drive roller 700 is constantly rotating in a counterclockwise direction which is opposite to input drive rubber roller 402. The nip formed between drive roller 700 and idler roller 600 has slight frictional characteristics and, therefore, apply a continuous retard force against the incoming sheet. However, this retarding force is not enough to inhibit forward movement of the incoming sheet through the nip. When the last portion of a sheet leaves the nip between rollers 401 and 402, the friction force of nip 600, 700 will cause the sheet to buckle around foam rollers 404 and into the output nip formed by rollers 402 and 403 for outward movement. Rollers 403 could be plastic or urethane. As soon as the sheet is "walked" around rollers 404 to the exit nip and is under control of the output rollers, the next sheet can be fed into the inverter allowing simultaneous sheet inversion. With simultaneous sheet inversion, two sheets (represented by arrows 80 and 81) are in the retard nip at the same time. After moving through nip 402, 403, the sheet approaches gate 120 which is actuated by controller 100 into either the dotted line or solid line positions shown in FIG. 1 depending on the reason for inverting. It is critical to the operation of this system that drive roll 700 be located on the upper side of input nip 401, 402 at a distance "d" of about 31 mm from the input nip. This results in the reduction of forces on the incoming sheet in the multiple mode while developing maximum drive out force on the outgoing sheet due to the placement of the drive roll and the deflection of the sheet by the guide baffles. The soft drive nip is placed about 10° above the input nip. The closeness of the retard nip to the tri-rolls allows sheets to enter the retard nip without buckling.

The tri-roll inverter system of the present invention has advantages over prior tri-roll inverters in that the present system inverts sheets of wide differences in weights and sizes with equal ease whether the inversion takes place with the inverter in a horizontal or vertical plane. This universality of inverter 116 is accomplished by the use of tri-rollers comprising an input shaft assembly of smooth rollers 401, an output shaft assembly of urethane rollers 403, and a middle shaft assembly of rubber rollers 402 flanked by foam rollers 404 of greater diameter.

Figure 3:
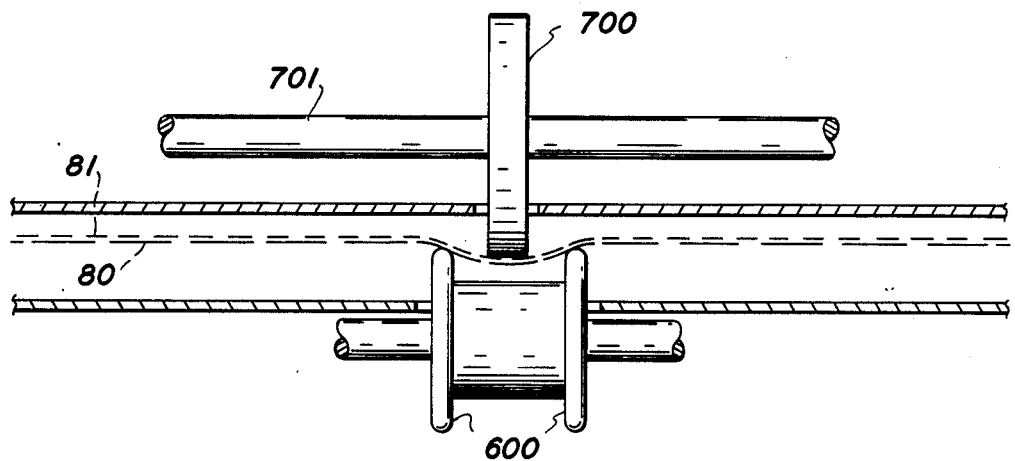
FIG. 3 is a partial end view of the embodiment of the invention shown in FIG. 2 taken along line 3—3.

In FIG. 3, there is no contact between the upper drive roller 700 and the lower idler roller 600. The stiffness of the paper provides the normal force to drive roller 700, which through the friction force of ring members 600, is converted into drive force for the paper. As the stiffness of the paper varies, the paper drive force varies in direct proportion. Thus, different stiffnesses of paper can be fed through this system against devices that change their velocities, i.e., stops or other deceleration devices, without lead edge damage to low beam strength papers, but with a large drive force for high beam strength papers.

The drive force of roller 700 will drive the trail edges of sheets leaving the input nip into foam rollers 404, and since the rollers are pliable, the sheets will easily ride into and be carried by the surface of rollers 404 into the output nip formed by rollers 402 and 403. The ease of workability of the present system is enhanced by the proximity of the roll on roll to the input nip. Positioning the roll on roll nip a distance of about 31 millimeters from the input nip reduces the length of the sheet beam thereby increasing the sheet flexure strength and reducing the chance of a sheet collapsing as it enters the roll on roll nip.

In conclusion, a substrate inverter is disclosed that includes an input nip formed by urethane rollers 401 and rubber rollers 402. The shaft that supports rollers 402 also has oversized foam rollers 404 thereon. Rollers 402 drive the substrate material through a retard drive force applicator having a nip formed between drive roller 700 and idler roller 600. The roller 700 is rotating in a direction to oppose the motion of the incoming substrate with a small friction force. However, this friction force is small enough so as to allow the incoming substrate to be forced through the nip. After the last portion of the substrate passes through the input nip, the friction force from the retard nip forces the trail edge of the incoming sheet to maintain contact with foam rollers 404. This causes the trail edge to "walk around" to the exit nip formed between rollers 402 and 403. As soon as the substrate is under control of the exit nip, the next substrate can be fed into the inverter allowing simultaneous substrate inversion.

While the inverter system disclosed herein is preferred, it will be appreciated that various alternatives, modifications, variations or improvements thereon may be made by those skilled in the art, and the following claims are intended to encompass all of those falling within the true spirit and scope of the invention.

What is claimed is:

1. In a tri-roll sheet inverter mechanism having an input nip and an output nip for feeding sheets into and out of a first end of a sheet reversing chute to reverse the lead and trail edge orientation of the sheets, the improvement comprising:

retard drive nip means located at a second end of said chute to receive the leading edges of the sheets directed into said reversing chute and adapted to dampen the kinetic energy of an incoming sheet into said retard drive nip means while at the same time driving another sheet out of said retard drive nip means and into said output nip.

2. The inverter of claim 1, wherein said input nip comprises urethane rollers mounted on a first shaft for frictional contact with rubber rollers mounted on a second shaft, said second shaft also including foam rollers mounted thereon adjacent said rubber rollers and out of peripheral contact with any other rollers, said foam rollers having a larger diameter than said rubber rollers and adapted to allow sheets to penetrate thereinto and to deliver the sheets to said output nip.

3. The inverter of claim 1 wherein said retard drive nip means is located about 10° above a horizontal plane through said input nip.

4. The inverter of claim 3, wherein said retard drive nip means and said input nip are about 31 mm apart.

5. In a method of reversing the direction of sheets of variable dimensions by feeding them into one end of a reversing chute and feeding them out of the same end of said chute so that the lead edge and trail edge orientation of the sheets is reversed, the improvement comprising the steps of:

(a) driving the lead edges of sheets into said chute by contact with a first urethane roll and a rubber roll that forms an input nip;

(b) providing a foam roll having a greater diameter than said rubber roll adjacent to said rubber roll;

(c) providing a return force nip and applying a return force against the sheets as they are driven into said chute, said return force being applied by a corrugating upper roll and lower roll nip with said upper roll constantly rotating in a direction opposite to the incoming direction of the sheets in order to drive and thereby positively urge the trail edge of the sheets against said foam roll, said foam roll serving to transport the trail edges of the sheets to an output nip formed by said rubber roll and a second urethane roll; and (d) simultaneously accommodating more than one sheet within said return force nip at one time.

6. The method of claim 5, wherein said return force nip is located 10° above said input nip.

7. The method of claim 5 including the step of locating said return force nip above a horizontal plane through said input nip.

* * * * *